United States Patent
Zhao et al.

(10) Patent No.: US 12,511,032 B2
(45) Date of Patent: *Dec. 30, 2025

(54) USER INTERFACE CONTROL BASED ON PINCH GESTURES

(71) Applicant: Omnissa, LLC, Palo Alto, CA (US)

(72) Inventors: Ming Zhao, Beijing (CN); Yunfei San, Beijing (CN); Peng Guo, Beijing (CN); Qiaoyan Hou, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 15/995,535

(22) Filed: Jun. 1, 2018

(65) Prior Publication Data

US 2018/0275868 A1     Sep. 27, 2018

Related U.S. Application Data (63) Continuation of application No. 14/306,227, filed on Jun. 17, 2014, now Pat. No. 10,042,547.

(51) Int. Cl.
| | |
|---|---|
| *G06F 3/00* | (2006.01) |
| *G06F 3/0481* | (2022.01) |
| *G06F 3/04845* | (2022.01) |
| *G06F 3/04883* | (2022.01) |
| *G06F 3/0484* | (2022.01) |
| *G06F 3/04842* | (2022.01) |

(52) U.S. Cl.
CPC ........ *G06F 3/04883* (2013.01); *G06F 3/0481* (2013.01); *G06F 3/04845* (2013.01); *G06F 3/0484* (2013.01); *G06F 3/04842* (2013.01)

(58) Field of Classification Search
CPC .............. G06F 3/04883; G06F 3/0481; G06F 3/04845; G06F 3/0484; G06F 3/04842
See application file for complete search history.

(56) References Cited

U.S. PATENT DOCUMENTS

| | | | | |
|---|---|---|---|---|
| 6,144,974 A | * | 11/2000 | Gartland | .................. G06T 11/60 |
| | | | | 715/205 |
| 8,074,181 B2 | * | 12/2011 | Zaman | .................. G06F 3/0481 |
| | | | | 715/784 |
| 8,400,477 B1 | * | 3/2013 | Young | ................. G06F 3/04845 |
| | | | | 345/665 |
| 8,739,060 B2 | * | 5/2014 | Lipsky | .................. G06F 3/0481 |
| | | | | 345/959 |
| 9,459,788 B2 | * | 10/2016 | Kang | .................. G06F 3/04883 |

(Continued)

*Primary Examiner* — Jessica S Manno
*Assistant Examiner* — Andrew Chung
(74) *Attorney, Agent, or Firm* — Kim & Stewart LLP (57) ABSTRACT

An example method is provided for a computing device to perform user interface control based on a pinch gesture. The computing device includes a touch-sensitive display. The method may comprise: displaying, on the touch-sensitive display, a user interface that includes a user interface element, which occupies part of the user interface and is selectable for resizing, and detecting, on the touch-sensitive display, a pinch gesture for resizing the user interface element within the user interface. The method may further comprise: determining a direction of the pinch gesture; and based on the direction of the pinch gesture, resizing the user interface element horizontally, vertically or diagonally within the user interface.

12 Claims, 11 Drawing Sheets

(56) References Cited

U.S. PATENT DOCUMENTS

| | | | |
|---|---|---|---|
| 10,353,566 B2* | 7/2019 | Pittappilly | G06F 3/0482 |
| 2004/0177325 A1* | 9/2004 | Keane | G06F 40/106 |
| | | | 715/255 |
| 2005/0195157 A1* | 9/2005 | Kramer | G06F 3/04845 |
| | | | 345/156 |
| 2005/0210380 A1* | 9/2005 | Kramer | G06F 3/04845 |
| | | | 715/244 |
| 2006/0001650 A1* | 1/2006 | Robbins | G06F 3/0421 |
| | | | 345/173 |
| 2006/0095863 A1* | 5/2006 | Van Leeuwen | G06F 3/0481 |
| | | | 715/788 |
| 2007/0220444 A1* | 9/2007 | Sunday | G06F 3/0488 |
| | | | 715/788 |
| 2008/0148177 A1* | 6/2008 | Lang | G06F 3/0481 |
| | | | 715/784 |
| 2009/0044123 A1* | 2/2009 | Tilton | G06T 13/80 |
| | | | 715/732 |
| 2009/0077503 A1* | 3/2009 | Sundstrom | G06F 3/04842 |
| | | | 715/856 |
| 2009/0174679 A1* | 7/2009 | Westerman | G06F 3/0418 |
| | | | 345/173 |
| 2010/0095206 A1* | 4/2010 | Kim | G06F 3/04883 |
| | | | 715/702 |
| 2010/0107118 A1* | 4/2010 | Pearce | G06F 3/0481 |
| | | | 715/799 |
| 2010/0241973 A1* | 9/2010 | Whiddett | G06F 3/04883 |
| | | | 715/762 |
| 2010/0306702 A1* | 12/2010 | Warner | G06F 3/0482 |
| | | | 715/811 |
| 2011/0012848 A1* | 1/2011 | Li | G06F 3/04166 |
| | | | 345/173 |
| 2011/0074710 A1* | 3/2011 | Weeldreyer | G06F 3/0481 |
| | | | 345/173 |
| 2011/0078597 A1* | 3/2011 | Rapp | G06F 3/04845 |
| | | | 715/765 |
| 2011/0078624 A1* | 3/2011 | Missig | G06F 3/04886 |
| | | | 715/802 |
| 2011/0107255 A1* | 5/2011 | Kim | G06F 3/0482 |
| | | | 715/786 |
| 2011/0181528 A1* | 7/2011 | Capela | G06F 3/04845 |
| | | | 345/173 |
| 2011/0197263 A1* | 8/2011 | Stinson, III | G06F 3/011 |
| | | | 726/4 |
| 2011/0209057 A1* | 8/2011 | Hinckley | G06F 3/0485 |
| | | | 715/702 |
| 2011/0209103 A1* | 8/2011 | Hinckley | G06F 3/0416 |
| | | | 715/863 |
| 2011/0225524 A1* | 9/2011 | Cifra | G06F 3/04883 |
| | | | 715/763 |
| 2011/0234522 A1* | 9/2011 | Lin | G06F 3/04883 |
| | | | 345/173 |
| 2012/0026100 A1* | 2/2012 | Migos | G06F 3/04883 |
| | | | 345/173 |
| 2012/0210261 A1* | 8/2012 | Sarnoff | G06F 3/04883 |
| | | | 715/765 |
| 2012/0324365 A1* | 12/2012 | Momchilov | G06F 3/14 |
| | | | 715/738 |
| 2013/0036382 A1* | 2/2013 | Yuan | G06F 3/0482 |
| | | | 715/815 |
| 2013/0038540 A1* | 2/2013 | Anderson | G06F 3/04842 |
| | | | 345/173 |
| 2013/0047119 A1* | 2/2013 | Lee | G06F 3/0481 |
| | | | 715/800 |
| 2013/0058019 A1* | 3/2013 | Lee | G06F 3/04883 |
| | | | 361/679.01 |
| 2013/0093791 A1* | 4/2013 | Arnold | G06F 3/04845 |
| | | | 345/650 |
| 2013/0100051 A1* | 4/2013 | Mochizuki | G06F 3/04842 |
| | | | 345/173 |
| 2013/0174100 A1* | 7/2013 | Seymour | G06F 3/0482 |
| | | | 715/863 |
| 2013/0222307 A1* | 8/2013 | Ozawa | G06F 3/041 |
| | | | 345/173 |
| 2014/0040820 A1* | 2/2014 | Ikeda | G06F 3/04883 |
| | | | 715/800 |
| 2014/0152702 A1* | 6/2014 | Takeda | G06F 3/0484 |
| | | | 345/661 |
| 2014/0165000 A1* | 6/2014 | Fleizach | H04M 19/04 |
| | | | 715/810 |
| 2014/0189486 A1* | 7/2014 | Yasoshima | H04L 65/403 |
| | | | 715/232 |
| 2014/0215365 A1* | 7/2014 | Hiraga | G06F 3/04883 |
| | | | 715/765 |
| 2014/0324962 A1* | 10/2014 | Lewin | H04L 67/141 |
| | | | 709/204 |
| 2014/0362119 A1* | 12/2014 | Freund | G06F 3/04883 |
| | | | 345/661 |
| 2015/0007078 A1* | 1/2015 | Feng | G06F 3/0484 |
| | | | 715/771 |
| 2015/0033176 A1* | 1/2015 | Miichi | G09B 29/007 |
| | | | 715/771 |
| 2015/0067605 A1* | 3/2015 | Zambetti | G06F 3/0488 |
| | | | 715/830 |
| 2015/0128091 A1* | 5/2015 | Laubach | G06F 3/04812 |
| | | | 715/810 |
| 2015/0205446 A1* | 7/2015 | Kuscher | G06F 3/04883 |
| | | | 715/798 |
| 2015/0215524 A1* | 7/2015 | Zhu | H04N 5/23216 |
| | | | 348/240.99 |
| 2015/0242101 A1* | 8/2015 | Ishino | G06T 7/75 |
| | | | 715/776 |
| 2015/0268822 A1* | 9/2015 | Waggoner | G06F 3/04842 |
| | | | 715/722 |
| 2015/0338942 A1* | 11/2015 | Stone | G06F 3/0488 |
| | | | 345/173 |
| 2015/0339267 A1* | 11/2015 | Janas | G06F 3/04842 |
| | | | 715/202 |
| 2015/0365306 A1* | 12/2015 | Chaudhri | G06F 3/0416 |
| | | | 715/736 |
| 2016/0034155 A1* | 2/2016 | Vranjes | G06F 3/04847 |
| | | | 715/803 |
| 2018/0067639 A1* | 3/2018 | Balaram | G04G 21/08 |
| 2019/0065023 A1* | 2/2019 | Fleizach | G06F 3/0488 |
| 2019/0268771 A1* | 8/2019 | Seo | G06F 1/163 |

* cited by examiner

USER INTERFACE CONTROL BASED ON PINCH GESTURES

CROSS-REFERENCE TO RELATED APPLICATIONS

This application is a continuation of and claims the benefit of U.S. patent application Ser. No. 14/306,227, entitled User Interface Control Based on Pinch Gestures, and filed Jun. 17, 2014, which is hereby incorporated by reference in its entirety.

BACKGROUND

Unless otherwise indicated herein, the approaches described in this section are not admitted to be prior art by inclusion in this section.

Gesture-based user interface control allows users to interact with computing devices such as smart phones, tablet computers, etc. For example, such computing devices usually have a touch-sensitive display to display a user interface and detect movement of one or more of a user's fingers over the touch-sensitive display. The movement is associated with one or more predefined gestures that are used for user interface control.

BRIEF DESCRIPTION OF DRAWINGS

FIGS. 3A, 3B, 3C, 30, 3E, and 3F illustrate example user interfaces each within which a user interface element may be resized horizontally, vertically or diagonally;

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The size of a touch-sensitive display of a mobile device (e.g., smartphone or tablet computer) is generally very small. Conventionally, an entire user interface (e.g., a remote desktop displayed on the touch-sensitive display via a client application) may be zoomed in or out depending on a user's gesture. For example, if the user places two fingers on the touch-sensitive display and moves the fingers farther apart, this movement is recognized as a "pinch out" gesture to zoom in. If the user moves the fingers closer together, this movement is recognized as a "pinch in" gesture to zoom out.

According to examples of the present disclosure, directional pinch gestures may be used to resize a user interface element (e.g., application window) within a user interface (e.g., a remote desktop displayed via a client application on the mobile device) displayed on a touch-sensitive display. In addition to recognizing a pinch gesture as a "pinch out" or "pinch in" gesture, a direction of the pinch gesture is determined to resize the user interface element within the user interface horizontally (e.g., width increases or decreases), vertically (e.g., height increases or decreases) or diagonally (e.g., width and height increase or decrease).

The direction of the pinch gesture provides users with a greater control of user interface elements within the user interface. For example, the user interface may include multiple user interface elements (e.g., multiple windows), from which one of them may be selected for resizing while the rest are unchanged. By determining the direction of the pinch gesture, the direction of the resizing may be controlled by the user, therefore improving user experience.

Figure 1:
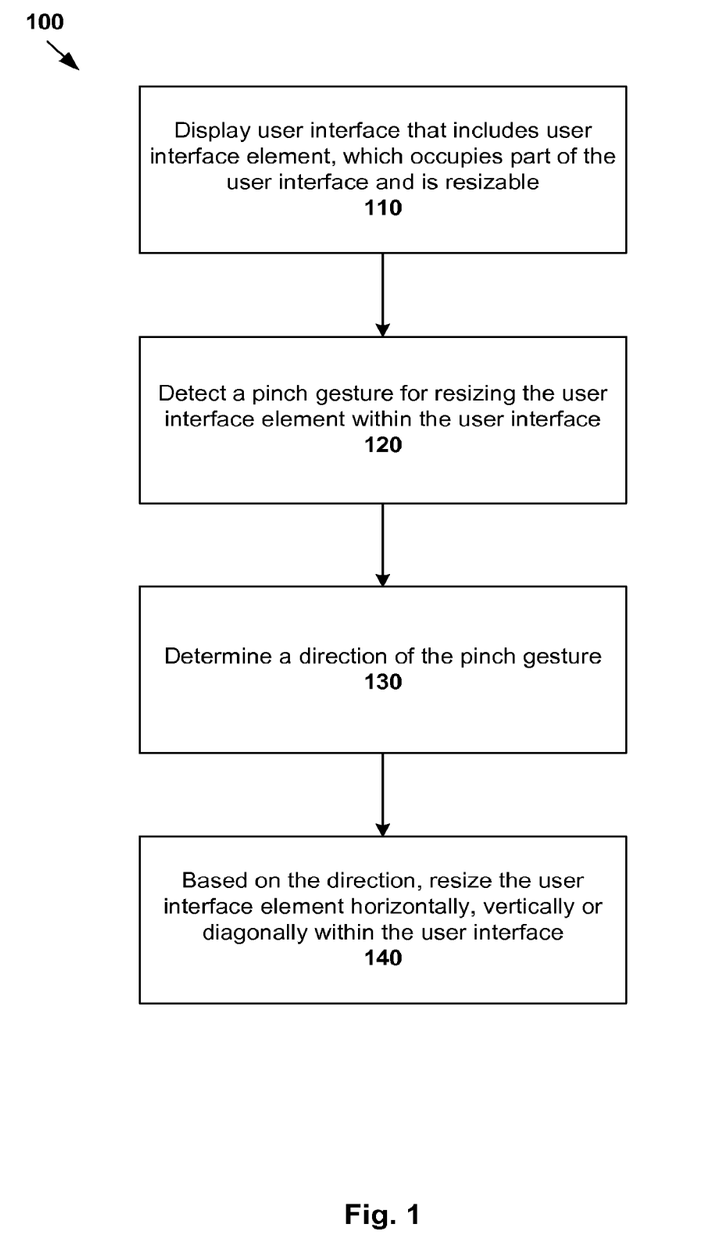
FIG. 1 is a flowchart of an example process for user interface control based on pinch gestures.

FIG. 1 illustrates example process 100 for user interface control based on pinch gestures. Process 100 may include one or more operations, functions, or actions illustrated by one or more blocks, such as blocks 110 to 140. The various blocks may be combined into fewer blocks, divided into additional blocks, and/or eliminated based upon the desired implementation. As used herein, the term "user interface control" refers generally to any suitable update, change, modification, or the like, to a user interface displayed on a computing device based on a user's interaction with the user interface. More specifically, according to examples in the present disclosure, pinch gestures are used to resize user interface elements within the user interface.

Example process 100 will also be explained with reference to FIG. 2, which is a schematic diagram illustrating example computing device 210 for user interface control based on pinch gestures 250. It should be understood that computing device 210 may include additional or alternative components, and may have a different configuration.

At block 110, computing device 210 displays, on touch-sensitive display 220, user interface 230 (e.g., a window showing a remote desktop) that includes user interface element 240 (e.g., an application running on the remote desktop), which occupies part of user interface 230 and is selectable for resizing. At block 120, pinch gesture 250 is detected on touch-sensitive display 220 for resizing user interface element 240 (without resizing user interface 230).

Figure 2:
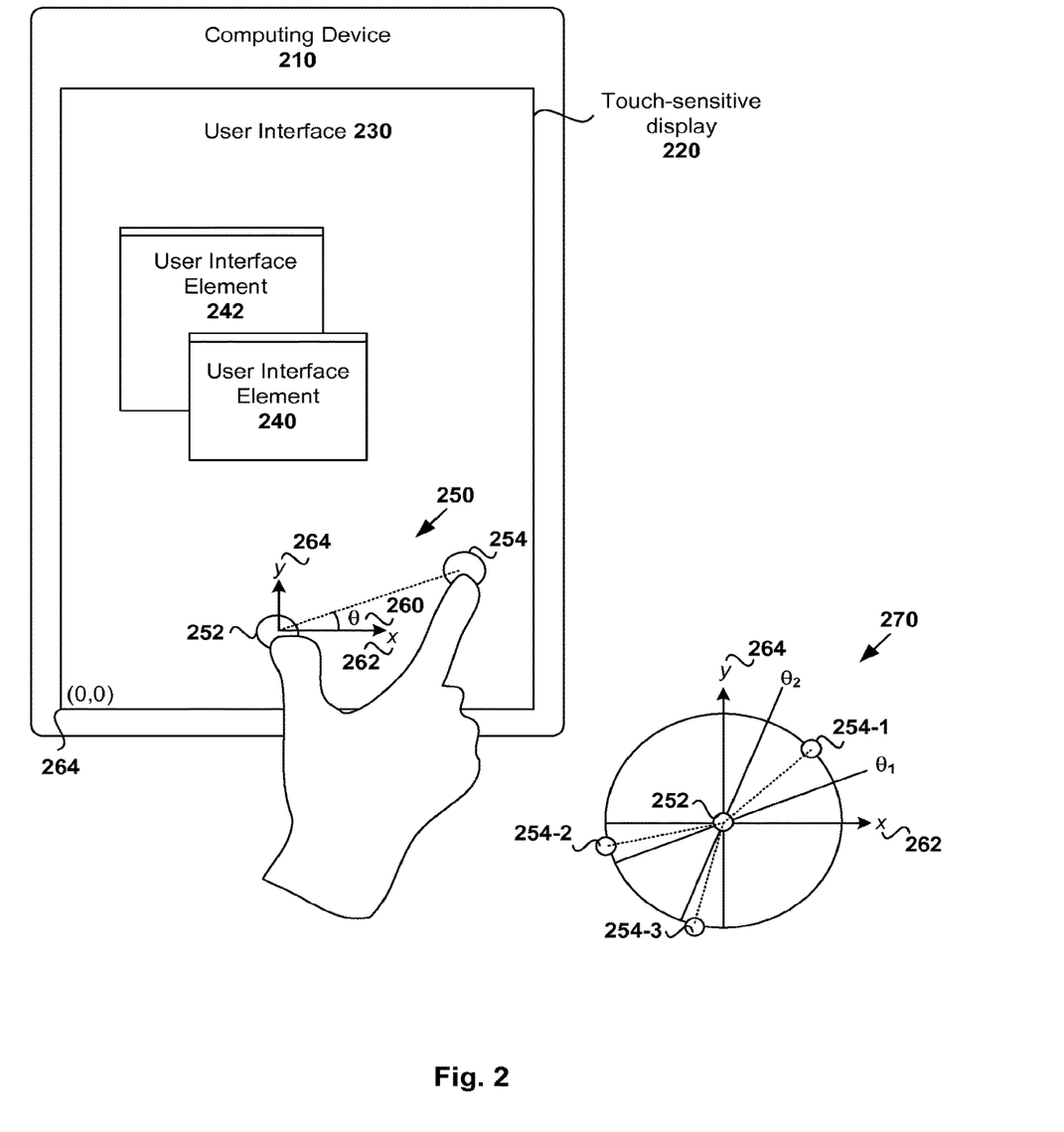
FIG. 2 is a schematic diagram illustrating an example computing device for user interface control based on pinch gestures.

In the example in FIG. 2, touch-sensitive display 220 displays user interface 230 that includes at least one user interface element (two elements 240 and 242 shown for simplicity). For example, using example process 100, user interface element 240 (shown in the foreground) may be resized within user interface 230 using pinch gesture 250, while user interface element 242 (shown in the background) remains unchanged. The pinch gesture 250 may include multiple touch points 252 and 254 at separate locations on touch-sensitive display 220.

At block 130, a direction of pinch gesture 250 is determined, such as based on angle 260 between touch points 252 and 254 relative to horizontal axis (see 262), etc. At block 140, based on the direction of pinch gesture 250, computing device 210 resizes user interface element 240 within user interface 230 horizontally (e.g., width increases or decreases), vertically (e.g., height increases or decreases) or diagonally (e.g., width and height increase or decrease).

As used herein, the term "user interface element" may refer to any suitable resizable element (e.g., 240 or 242) on user interface 230, such as an application window (e.g., document processing application, email application, game application, etc.), object (e.g., image), message, notification, etc. For example, user interface 230 may display a desktop that includes windows of applications running on computing device 210. In this case, user interface elements 240 and 242 may be "windows" within the desktop, where the term "window" may refer to an enclosed area on user interface 230 which is generally rectangular but not necessarily so. Although not shown, the "desktop" may include other pictures, icons, widgets, folders, etc. that can be used to activate applications, windows, files, folders, documents and other graphical items. For example, user interface element 240 may be a window for an email application, while user interface element 242 a window for a word processing application, etc.

In relation to block 120 in FIG. 1, to determine which user interface element 240/242 has been selected for resizing, computing device 210 may determine which user interface element 240/242 is currently in the foreground or in focus. For example, an attribute of user interface element 240 that is indicative of it being in the foreground and/or in focus may be used. For Android applications, the "isForeground( )" function may be used to check whether an application is active and its window is in the foreground. For iOS applications, computing device 110 may determine whether the application is in an active state, i.e. whether "UIApplicationStateActive" is true. Similarly, for Windows applications, the "IsWindowVisible( )" function may be used check whether a window is visible, or "GetForegroundWindow" function to obtain a handle to a foreground window.

Since user interface element 240 that is in the foreground is selected for resizing, pinch gesture 250 may or may not be detected on user interface element 240. Since touch-sensitive display 220 is generally of limited screen size, this further improves the user's experience because it is not necessary to place touch points 252 and 254 directly on the small area of user interface element 240. Further, it is not necessary for the user to place touch points 252 and 254 on edges (often only a few pixels) of user interface element 240 in order to resize it. As such, it is also not necessary for a user to control a mouse cursor on user interface 130, or touch the edge of user interface element 240 exactly to resize user interface element 240. Since the edges of user interface element 240 are generally very small (e.g. several pixels), examples of the present disclosure relieve the users from having to select the edges to resize user interface element 240.

After resizing user interface element 240, the user may then select another user interface element (e.g., 242) for resizing. For example, the user may place a tap gesture on user interface element 242 such that it switches to the foreground (in which case user interface element 240 will be switched to the background). Similarly, to select the entire user interface 230 (e.g., desktop) for resizing, a tap gesture may be placed on user interface 230, followed by pinch gesture 250.

Pinch gesture 250 may be a "pinch out" gesture (also known as an "expand" gesture) to enlarge user interface element 240, or "pinch in" (also known as a "squeeze" gesture) to reduce its size. For example, "pinch out" gesture 250 may be detected when touch points 252 and 254 are detected to move away from each other on touch-sensitive display 220. On the other hand, "pinch in" gesture 250 may be detected when touch points 252 and 254 are detected to move towards each other.

Computing device 210 may be any suitable device with touch-sensitive display 220, such as smartphone, notebook computer, tablet computer, personal digital assistant (PDA), wearable computer (e.g., smart watch, etc.), desktop computer, etc. The term "touch-sensitive display" (also known as "touch screen") may generally refer to a physical structure that enables a user to interact with computing device 210 using touch inputs. Touch-sensitive display 220 may sense a touch point in a number of ways, such as by a change in an electrical parameter (e.g., resistance or capacitance), infrared radiation proximity detection, light variation detection, proximity sensor, etc. Touch-sensitive display 220 may use any suitable display technology, such as liquid crystal display (LCD), light emitting polymer display (LPD), light emitting diode (LED), etc. Touch points 252 and 254 may be detected using any suitable touch inputs, such as finger inputs (as shown in FIG. 2) or stylus inputs.

Contact with touch-sensitive display 220 may be detected for performing various user interface control, such as determining if contact has been made (e.g., detecting a "finger-down" event), determining whether the contact has been moved (e.g., detecting a "finger-dragging" event) and determining if the contact has ceased (e.g., detecting a "finger-up" event). Pinch gestures 250 may be detected based on a particular gesture pattern, such as by detecting two finger-down events at two positions (see 252 and 254) on touch-sensitive display 220, followed by a finger-dragging event at each position. Although two contact points are illustrated in FIG. 2 as an example, it will be appreciated that pinch gesture 250 may include more than two touch points. For example, for iOS and Android applications, pinch gesture 250 may include three touch points and its direction determined based on the positions of the three touch points.

Directional Pinch Gestures

According to blocks 130 and 140 in FIG. 1, pinch gesture 250 is associated with a direction to resize user interface element 240 horizontally, vertically or diagonally.

The direction of pinch gesture 250 may be determined using any suitable approach, such as based on angle 260 between touch points 252 and 254. In the example in FIG. 2, angle 260 is shown as relative to horizontal axis 262, but it will be appreciated that it may be relative to vertical axis 264 or any other suitable axis (not shown for simplicity) instead.

The position of touch point 252 may be represented as $(x_a, y_a)$ and that of touch point 254 as $(x_b, y_b)$. Note that positions $(x_a, y_a)$ and $(x_b, y_b)$ may be defined based on a reference point at $(0, 0)$, such as at the bottom-left corner (see 264) of user interface 230 on touch-sensitive display 220. Using |yb−ya| and |xb−xa| to represent the absolute vertical and horizontal distances between (xa, ya) and (xb, yb) respectively, angle 260 may be determined as follows:

$$\theta = \arctan\left(\frac{|ya - yb|}{|xa - xb|}\right).$$

The direction of pinch gesture 250 may be determined as "horizontal" "vertical" or "diagonal" by comparing angle 260 (θ) to any suitable threshold(s), such as horizontal threshold $\theta_1$ and vertical threshold $\theta_2$, as follows:

$$\text{Direction}(\theta) = \begin{cases} \text{horizontal,} & \text{if } 0 \le \theta < \theta_1 \\ \text{vertical,} & \text{if } \theta_2 < \theta \le 90 \\ \text{diagonal,} & \text{otherwise,} \end{cases}$$

Throughout the present disclosure, the term "horizontal direction" refers generally to a direction parallel to horizontal axis 262, or substantially parallel to horizontal axis 262 (i.e. "substantially horizontal") based on an allowable deviation (e.g., defined by horizontal threshold, $\theta_1$). Similarly, the term "vertical direction" refers generally to a direction perpendicular to horizontal axis 262, or "substantially" perpendicular to horizontal axis 262 (i.e. "substantially vertical") based on an allowable deviation (e.g., defined by vertical threshold $\theta_2$). The term "diagonal direction" refers generally to a direction that is neither "horizontal" nor "vertical" (e.g., based on deviations allowed by horizontal threshold $\theta_1$ and vertical threshold $\theta_2$).

Using $\theta_1=30$ and $\theta_2=60$ as examples, if angle 260 (e.g., θ=20) is less than 30 degrees, the direction of pinch gesture 250 is approximated as horizontal. If angle 260 (e.g., θ=75) is greater than 60 degrees, the direction of pinch gesture 250 is approximated as vertical. Otherwise, if angle 260 (e.g., θ=56) is greater than or equals to 30 degrees but less than or equals to 60 degrees, the direction of pinch gesture 250 is approximated as diagonal.

As generally indicated at 270, FIG. 2 includes example pinch gestures 250 having a diagonal direction (see touch points 252 and 254-1), horizontal direction (see touch points 252 and 254-2) and vertical direction (see touch points 252 and 254-3) according to the equations discussed above.

FIG. 3A to FIG. 3F illustrate example user interfaces 230 within which user interface element 240 is resized (a) horizontally, (b) vertically or (c) diagonally. The scale of the resizing may depend on a magnitude and a speed of pinch gesture 250. For example, a faster pinch gesture 250 may cause a greater scale of resizing compared to a slower speed pinch gesture 250.

For simplicity, user interface element 242 is not shown on FIG. 3A to FIG. 3F, but it will be appreciated that user interface element 242 remains unchanged in the background after user interface element 240 is resized (only user interface element 240 is resized, but user interface element 242 may be more visible or less visible depending on whether the size of user interface element 240 increases or decreases).

(a) Horizontal Resizing

Figure 3A:
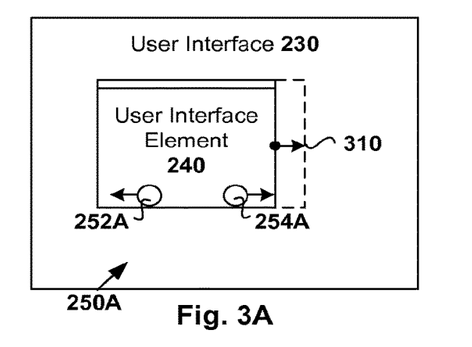
Figure 3B:
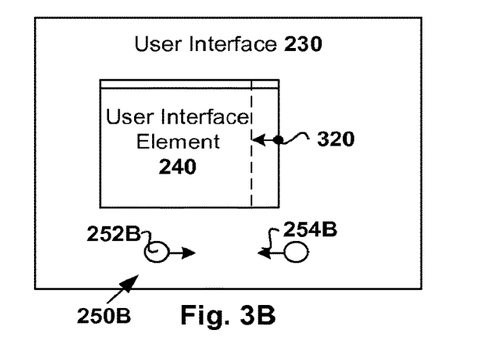

Referring to the example in FIG. 3A, pinch gesture 250A is determined to have a horizontal direction based on an angle between touch points 252A and 254A. When touch points 252A and 254A are detected to move away from each other, pinch gesture 250A is detected as a "pinch out" gesture in a horizontal direction, and the width of user interface element 240 is increased (see 310).

In the example in FIG. 38, pinch gesture 250B is also determined to have a horizontal direction based on an angle between touch points 252B and 2548. When touch points 252B and 254B are detected to move towards each other, pinch gesture 250B is detected as a "pinch in" gesture in a horizontal direction and the width of user interface element 240 is decreased (see 320).

(b) Vertical Resizing

Figure 3C:
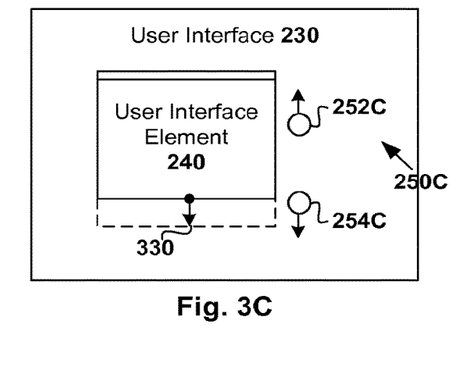

Referring to the example in FIG. 3C, pinch gesture 250C is determined to have a vertical direction based on an angle between touch points 252C and 254C. When touch points 252C and 254C are detected to move away from each other, pinch gesture 250C is detected as a "pinch out" gesture in a vertical direction, and the height of user interface element 240 is increased (see 330).

On the other hand, in the example in FIG. 30, when touch points 252D and 254D are detected to move towards each other, pinch gesture 250D is detected as a "pinch in" gesture in a vertical direction and the height of user interface element 240 is decreased (see 340).

(c) Diagonal Resizing

Figure 3D:
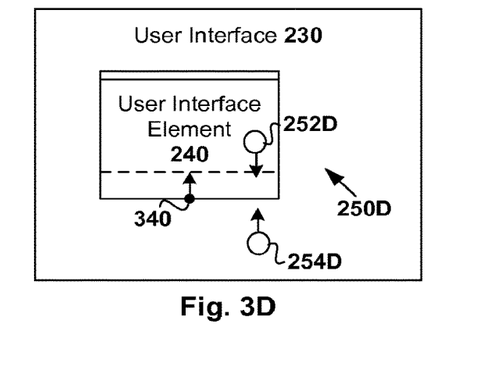
Figure 3E:
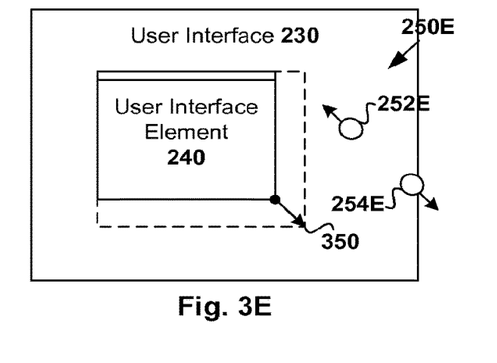
Figure 3F:
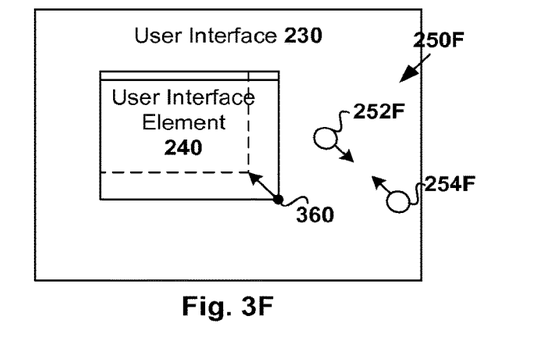

Referring to the example in FIG. 3E, pinch gesture 250E is determined to have a diagonal direction based on an angle between touch points 252E and 254E. When touch points 252E and 254E are detected to move away from each other, pinch gesture 250E is detected as a "pinch out" gesture in a diagonal direction. As a result, the width and height of user interface element 240 are increased (see 350). On the other hand, in the example in FIG. 3F, when touch points 252F and 254F are detected to move towards each other, pinch gesture 250F is detected as a "pinch in" gesture in a diagonal direction and the width and height of user interface element 240 are decreased (see 360).

Position-Aware Pinch Gestures

As illustrated in FIGS. 3A-3F, touch points (e.g., 252A-F and 254A-F) may be detected anywhere on user interface 230. For example, in FIG. 3A, touch points 252A and 254A are detected on user interface element 240. In FIG. 3D, however, touch point 252D is detected on user interface element 240, while touch point 254D is detected outside of user interface element 240. In other examples, touch points (e.g., 252E-F and 254E-F in FIGS. 3E-3F) are detected outside of user interface element 240 within user interface 230.

To determine how user interface element 240 is resized within user interface 230, block 140 in FIG. 1 may further include selecting an edge or corner of user interface element 240 from which it is resized. For example, when resizing user interface element 240 horizontally in FIGS. 3A-3B, the width of user interface element 240 may be adjusted from its left or right edge. For vertical resizing in FIGS. 3C-3D, the height may be adjusted from its top or bottom edge. For diagonal resizing in FIGS. 3E-3F, the width and height may be adjusted from one of the four corners (i.e., top left, bottom left, top right and bottom right) of user interface element 240.

The selection of an edge or corner from which user interface element 240 is resized may be based on the position of user interface element 240 within user interface 230. In this case, pinch gesture 250 may also be referred to as "position-aware" pinch gesture 250. As will be explained using FIG. 4 to FIG. 90D, the selection may depend on an initial center position (x1, y1) of user interface element 240 (before resizing) when compared to a center position (x0, y0) of user interface 230. Although various position-based examples are shown in FIG. 4 to FIG. 9D, it will be appreciated that any other suitable approach may be used to select the edge or corner from which user interface element 240 is resized, such as a random selection, etc.

Assuming that user interface element 240 has an updated center position (x2, y2) after resizing, the selection may cause (x2, y2) to adhere to (x0, y0), or move closer to (x0, y0) when compared to (x1, y1). Since touch-sensitive display 220 is generally of limited size, this places user interface element 240 closer to the centre of the screen after the resizing to facilitate better viewing. Various examples will now be explained with reference to FIG. 4 and FIG. 5A-5D (horizontal), FIG. 6 and FIG. 7A-7D (vertical) and FIG. 8 and FIG. 9A-9D (diagonal).

(a) Position-Aware Horizontal Resizing

Figure 4:
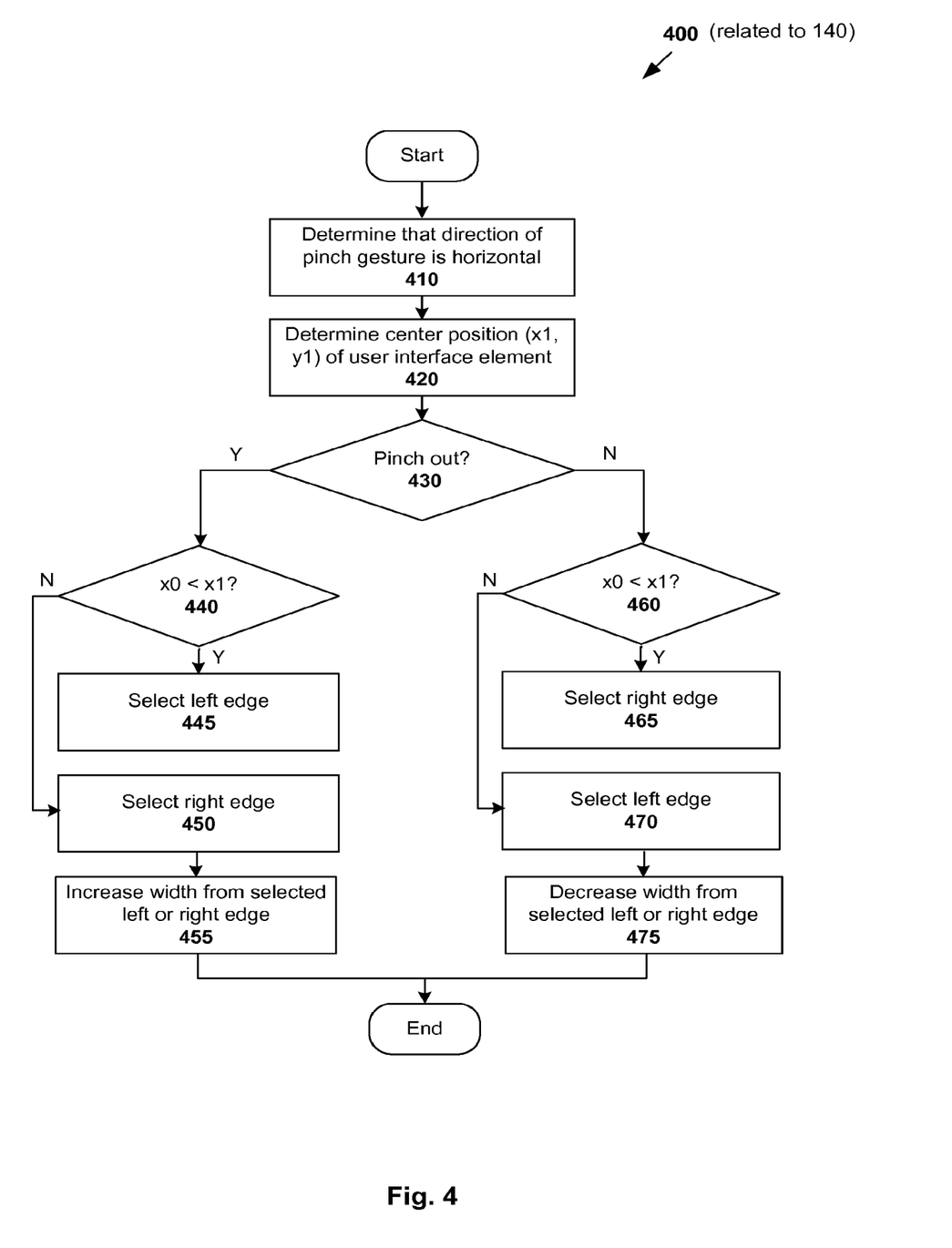
FIG. 4 shows a flowchart of an example process for horizontal resizing of a user interface element based on its position within a user interface.

FIG. 4 shows a flowchart of an example process 400 for horizontal resizing of user interface element 240 based on its position within user interface 230. Process 400 may include one or more operations, functions, or actions illustrated by one or more blocks, such as blocks 410 to 475. The various blocks may be combined into fewer blocks, divided into additional blocks, and/or eliminated based upon the desired implementation. FIG. 4 will be explained with reference to FIGS. 5A-5O, which illustrate example user interfaces 230 each showing user interface element 240 that is resized horizontally based on its initial position (x1, y1).

At blocks 410 and 420, after determining that the direction of pinch gesture 250 is horizontal, computing device 210 determines the initial center position (x1, y1) of user interface element 240. For example, position (x1, y1) may be relative to any suitable reference point, such as origin (0, 0) at the bottom-left corner (see 264) of user interface 230 on touch-sensitive display 220.

Blocks 430 to 455 are related to a "pinch out" gesture 250 to increase the width of user interface element 240. At block 440, position x1 of user interface element 240 is compared against position x0 of user interface 230. At block 445, if x0<x1 (i.e. x0 is to the left of x1), the left edge of user interface element 240 is selected. Otherwise, at block 450, the right edge of user interface element 240 is selected.

Figure 5A:
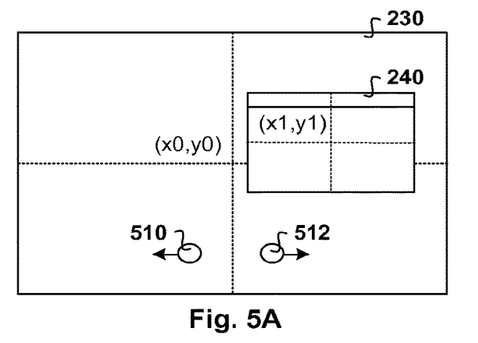
FIGS. 5A, 5B, 5C, and 5D illustrate example user interfaces each showing a user interface element that is resized horizontally based on its position.
Figure 5B:
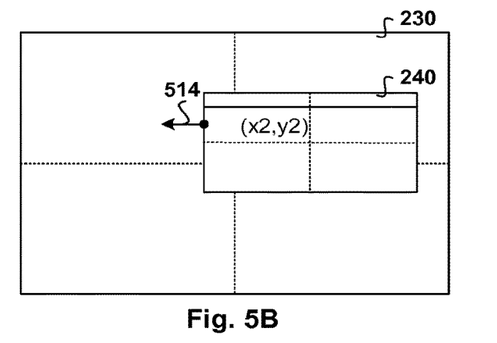

Referring also to FIG. 5A, when touch points 510 and 512 are detected to move away from each other, computing device 210 may determine that a "pinch out" gesture is detected. In this example, since x0<x1 is true at block 440, the left edge of user interface element 240 is selected at block 445. As such, as shown in FIG. 5B, computing device 210 increases the width of user interface element 240 at block 455 by "dragging" the selected left edge outwardly and horizontally (see 514).

Blocks 430 and 460 to 475 are related to a "pinch in" gesture 250 to decrease the width of user interface element 240. At block 460, position x1 of user interface element 240 is compared against position x0 of user interface 230. At block 465, if x0<x1 (i.e. x0 is to the left of x1), the right edge of user interface element 240 is selected. Otherwise, at block 450, the left edge of user interface element 240 is selected.

Figure 5C:
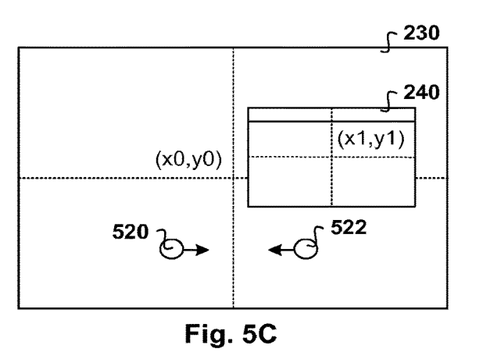
Figure 5D:
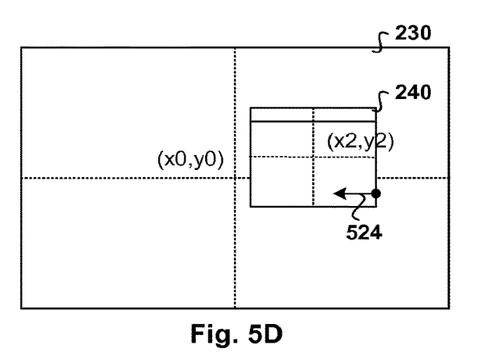

Referring also to FIG. 5C, when touch points 520 and 522 are detected to move towards each other, computing device 210 may determine that a "pinch in" gesture is detected. In this example, x0<x1 is true at block 460, and causes the selection of the right edge of user interface element 240 at block 465. As such, as shown in FIG. 5D, the width of user interface element 240 is decreased at block 470 by "dragging" the selected right edge inwardly and horizontally (see 524).

After resizing, the center position of user interface element 240 is represented as (x2, y2). As can be seen in FIG. 5B and FIG. 5D, (x2, y2) may be closer to (x0, y0) after resizing, when compared to its initial position (x1, y1) before resizing. This allows user interface element 240 to be more "centered" relative to (x0, y0) of user interface 230 to facilitate better viewing.

(b) Position-Aware Vertical Resizing

Figure 6:
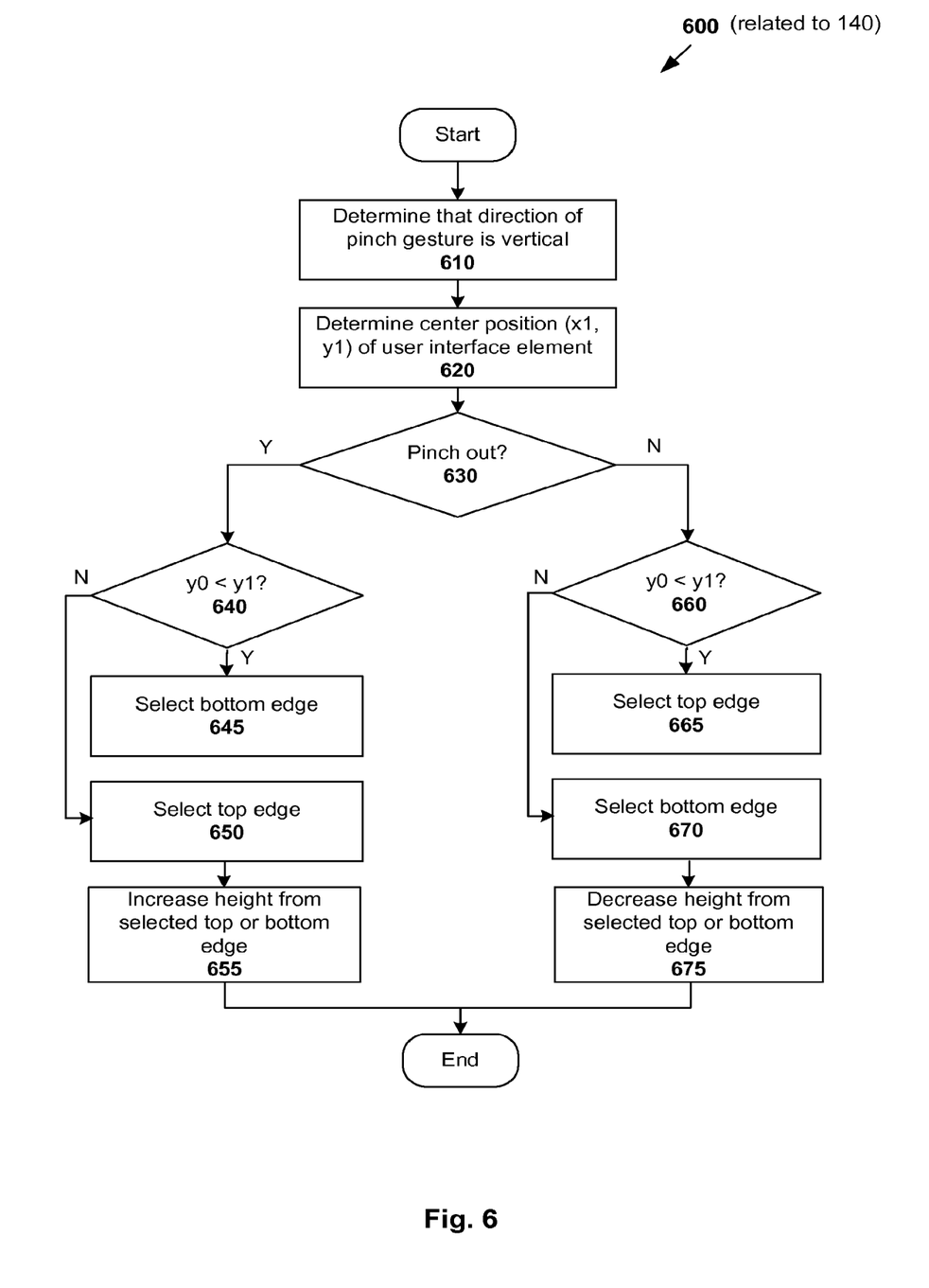
FIG. 6 shows a flowchart of an example process for vertical resizing of a user interface element based on its position within a user interface.

FIG. 6 shows a flowchart of an example process 600 for vertical resizing of user interface element 240 based on its position within user interface 230. Process 600 may include one or more operations, functions, or actions illustrated by one or more blocks, such as blocks 610 to 675. The various blocks may be combined into fewer blocks, divided into additional blocks, and/or eliminated based upon the desired implementation. FIG. 6 will be explained with reference to FIGS. 7A-7D, which illustrate example user interfaces 230 each showing user interface element 240 that is resized vertically based on its initial position (x1, y1).

At blocks 610 and 620, after determining that the direction of pinch gesture 250 is vertical, computing device 210 determines the initial center position (x1, y1) of user interface element 240. Similar to blocks 410 and 420 in FIG. 4, position (x1, y1) may be relative to any suitable reference point, such as origin (0, 0) at the bottom-left corner (see 264 in FIG. 2) of user interface 230 on touch-sensitive display 220.

Blocks 630 to 655 are related to a "pinch out" gesture 250 to increase the height of user interface element 240. At block 640, position y1 of user interface element 240 is compared against position y0 of user interface 230. At block 645, if y0<y1 (i.e. y0 is below y1), the bottom edge of user interface element 240 is selected. Otherwise, at block 650, the top edge of user interface element 240 is selected.

Figure 7A:
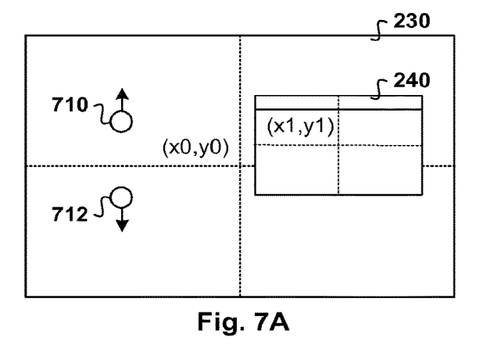
FIGS. 7A, 7B, 7C, and 7D illustrate example user interfaces each showing a user interface element that is resized vertically based on its position.
Figure 7B:
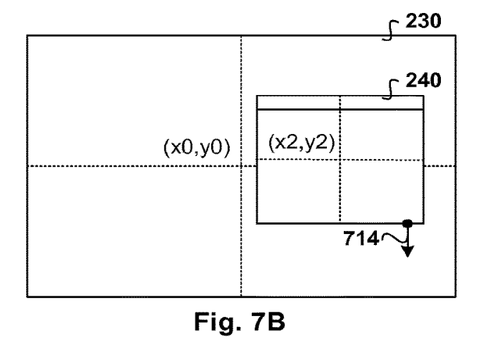

Referring also to FIG. 7A, when touch points 710 and 712 are detected to move away from each other, computing device 210 may determine that a "pinch out" gesture is detected. In this example, y0<y1 is true at block 640, and causes the selection of the bottom edge of user interface element 240 at block 645. As such, as shown in FIG. 7B, the height of user interface element 240 is increased at block 655 by "dragging" the selected bottom edge outwardly and vertically (see 714).

Blocks 630 and 660 to 675 are related to a "pinch in" gesture 250 to decrease the height of user interface element 240. At block 660, position y1 of user interface element 240 is compared against position y0 of user interface 230. At block 665, if y0<y1 (i.e. i.e. y0 is below y1), the top edge of user interface element 240 is selected. Otherwise, at block 670, the bottom edge of user interface element 240 is selected.

Figure 7C:
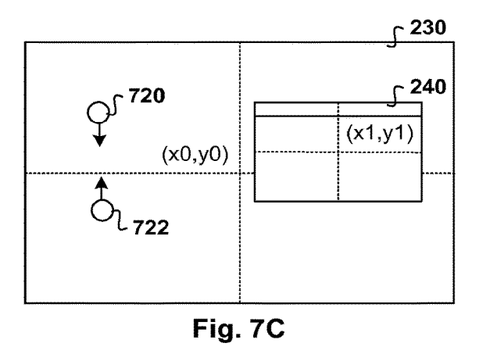
Figure 7D:
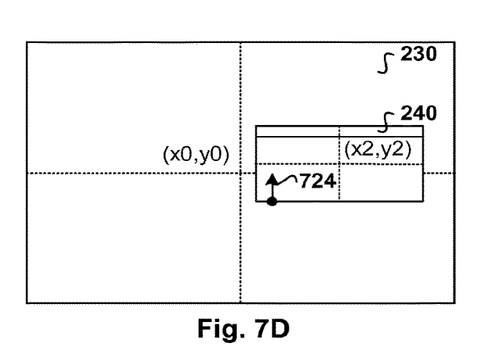

Referring also to FIG. 7C, when touch points 720 and 722 are detected to move towards each other, computing device 210 may determine that a "pinch in" gesture is detected. In this example, y0<y1 is true at block 660, and causes the selection of the bottom edge of user interface element 240 at block 665. As such, as shown in FIG. 7D, the height of user interface element 240 is decreased at block 670 by "dragging" the selected bottom edge inwardly and vertically (see 724).

After resizing, the center position of user interface element 240 is represented as (x2, y2). As can be seen in FIG. 7B and FIG. 7D, (x2, y2) may be closer to (x0, y0) after resizing, when compared to its initial position (x1, y1) before resizing. Again, this allows user interface element 240 to be more "centered" relative to (x0, y0) of user interface 230 after the vertical resizing to facilitate better viewing.

(b) Position-Aware Diagonal Resizing

Figure 8:
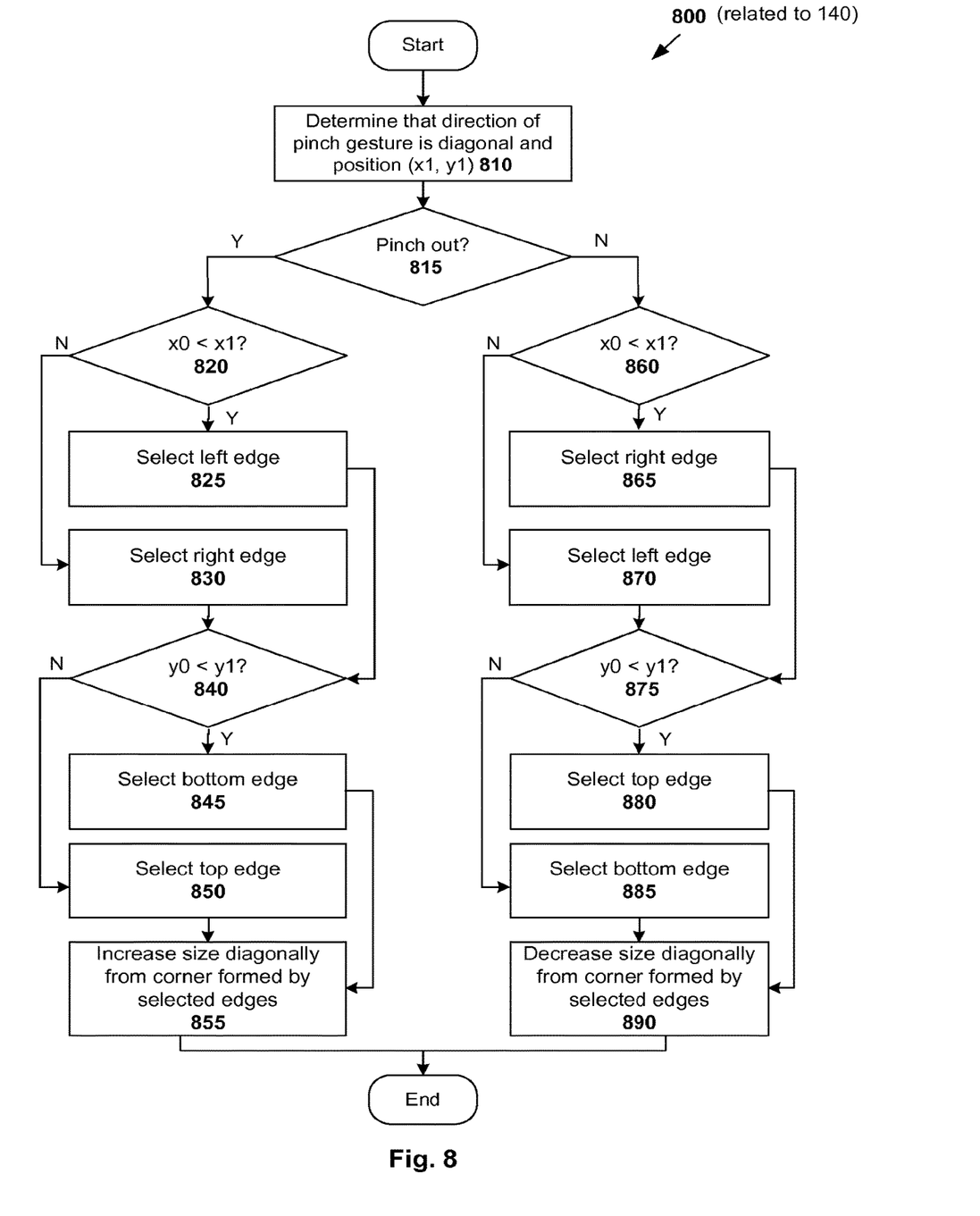
FIG. 8 shows a flowchart of an example process for diagonal resizing of a user interface element based on its position within a user interface.

FIG. 8 shows a flowchart of an example process 800 for diagonal resizing of user interface element 240 based on its position within user interface 230. Process 800 may include one or more operations, functions, or actions illustrated by one or more blocks, such as blocks 810 to 890. The various blocks may be combined into fewer blocks, divided into additional blocks, and/or eliminated based upon the desired implementation. FIG. 8 will be explained with reference to FIGS. 9A-9D, which illustrate example user interfaces 230 each showing user interface element 240 that is resized diagonally based on its initial position (x1, y1).

Similar to blocks 410 and 420 in FIG. 5 as well as 610 and 620 in FIG. 6, at block 810, computing device 210 determines that the direction of pinch gesture 250 is diagonal and the initial center position of user interface element 240 is represented as (x1, y1), such as with reference to origin (0, 0) of user interface 230 (see 264 in FIG. 2), etc.

Blocks 820 to 855 are related to a "pinch out" gesture 250 to increase the width and height of user interface element 240. At block 820, position x1 of user interface element 240 is compared against position x0 of user interface 230. At block 825, if x0<x1 (i.e. x0 is to the left of x1), the left edge of user interface element 240 is selected. Otherwise, at block 830, the right edge of user interface element 240 is selected.

Since diagonal resizing is required, at block 840, position y1 of user interface element 240 is also compared against position y0 of user interface 230. At block 845, if y0<y1 (i.e. y0 is below y1), the bottom edge of user interface element 240 is selected. Otherwise, at block 850, the top edge of user interface element 240 is selected. As a result, at block 855, one of the four corners of user interface element 240 may be selected, i.e. bottom left (when x0<x1 and y0<y1), bottom right (when x0 a x1 and y0<y1), top left (when x0<x1 and y0 z y1) and top right (when x0 z x1 and y0; y1).

Figure 9A:
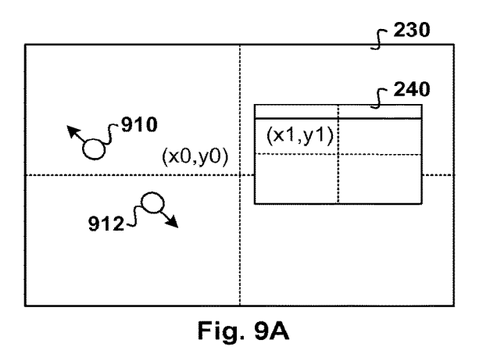
FIGS. 9A, 9B, 9C, and 9D illustrate example user interfaces each showing a user interface element that is resized diagonally based on its position.
Figure 9B:
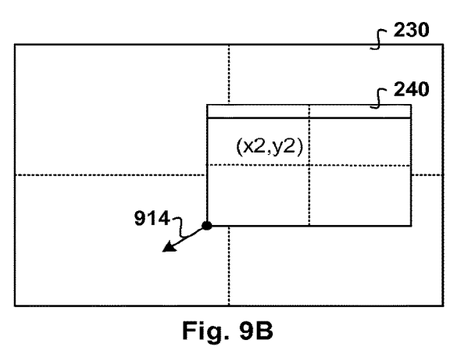

Referring also to FIG. 9A, when touch points 910 and 912 are detected to move away from each other, computing device 210 may determine that a "pinch out" gesture is detected. In this example, x0<x1 is true at block 820 and y0<y1 is also true at block 840. This causes the selection of the left and bottom edges of user interface element 240 at blocks 825 and 845 respectively. As such, as shown in FIG. 9B, the width and height of user interface element 240 are increased at block 855 by "dragging" the selected bottom left corner outwardly and diagonally (see 914).

Blocks 830 and 860 to 875 are related to a "pinch in" gesture 250 to decrease the width and height of user interface element 240. At block 860, position x1 of user interface element 240 is compared against position x0 of user interface 230. At block 865, if x0<x1 (i.e. x0 is to the left of x1), the right edge of user interface element 240 is selected. Otherwise, at block 850, the left edge is selected.

At block 875, position y1 of user interface element 240 is also compared against position y0 of user interface 230. At blocks 880 and 885, if y0<y1 (i.e. y0 is below y1), the top edge is selected, but otherwise, the bottom edge. As a result, at block 890, one of the four corners of user interface element 240 may be selected, i.e. bottom left (when x0≥x1 and y0≥y1), bottom right (when x0<x1 and y0 a y1), top left (when x0≥x1 and y0<y1) and top right (when x0<x1 and y0<y1).

Figure 9C:
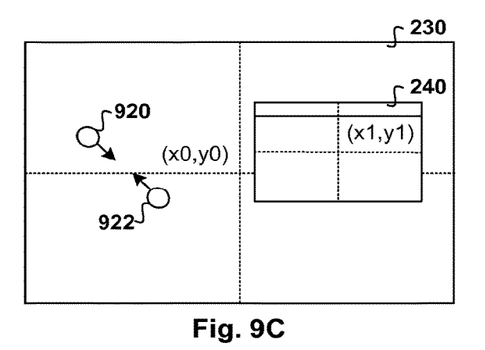

Referring also to FIG. 9C, when touch points 920 and 922 are detected to move towards each other, computing device 210 may determine that a "pinch in" gesture is detected. In this example, x0<x1 is true at block 860 and y0<y1 is also true at blocks 875. This causes the selection of the right and top edges of user interface element 240 at blocks 865 and 880 respectively. As such, as shown in FIG. 9B, the width and height of user interface element 240 are increased at block 890 by "dragging" the selected top right corner inwardly and diagonally (see 924).

Figure 9D:
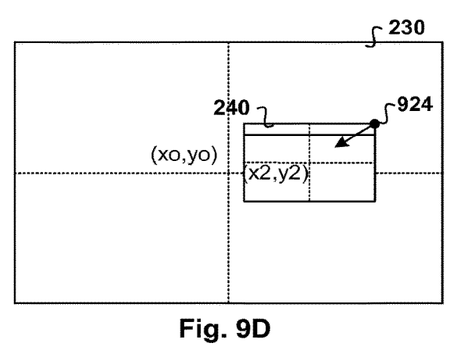

After resizing, the center position of user interface element 240 is represented as (x2, y2). As can be seen in FIG. 9B and FIG. 9D, the distance between (x2, y2) and (x0, y0) after resizing may reduce, when compared to the distance between (x1, y1) and (x0, y0) before resizing. Similarly, this allows user interface element 240 to be more "centered" after the diagonal resizing to facilitate better viewing.

Virtualized Desktop Application

Figure 10:
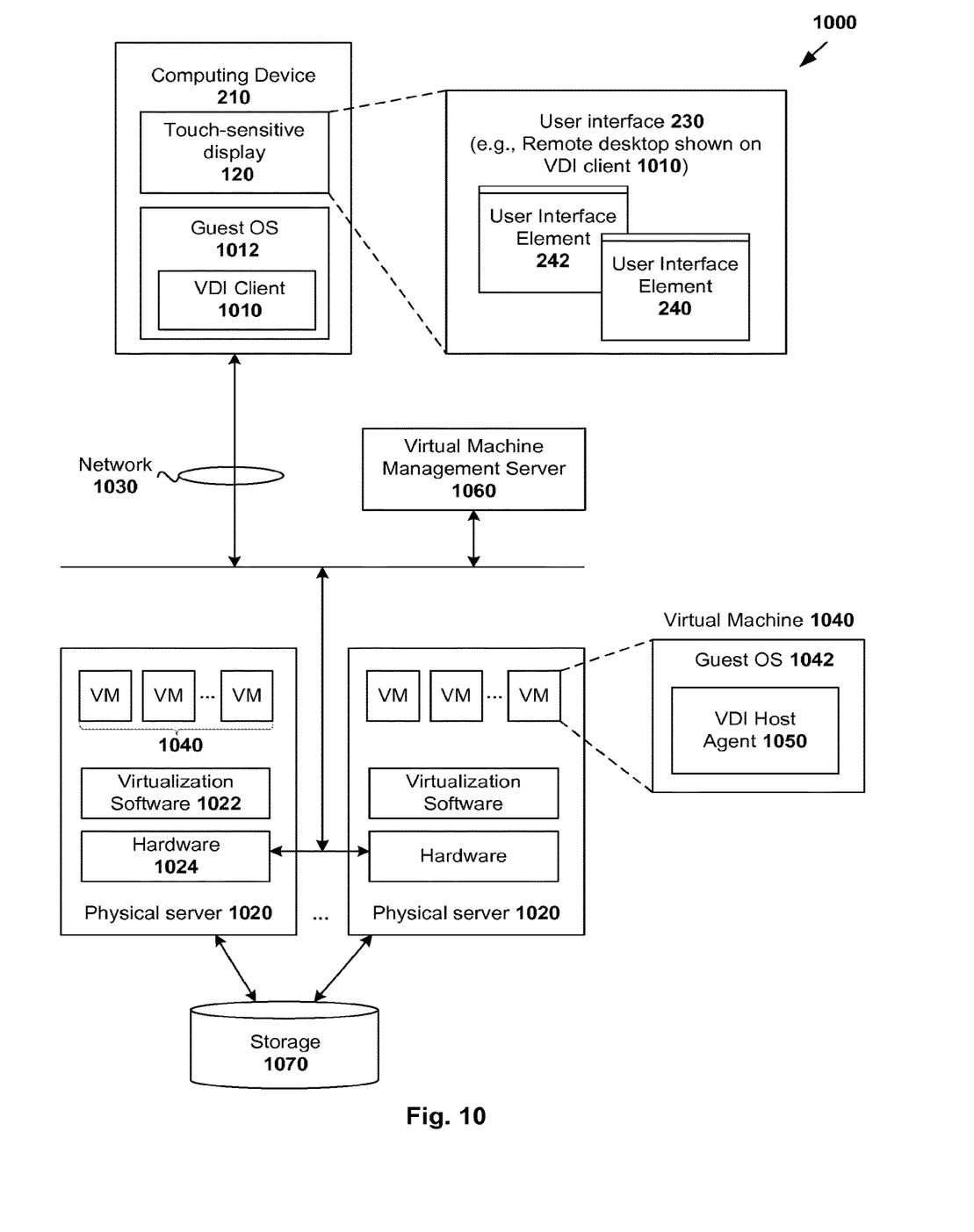
FIG. 10 is a schematic diagram illustrating an example virtualized computing environment that includes a computing device for resizing based on pinch gestures.

FIG. 10 is a schematic diagram illustrating example virtualized desktop system 1000 in which examples according to FIG. 1 to FIG. 90 may be implemented. Computing device 210, which acts as a client device, runs Virtual Desktop Infrastructure (VDI) client 1010 to allow access to a remote desktop supported by physical server 1020 via network 1030. Physical servers 100 may be physical machines or may each execute virtualization software 1022 and include suitable hardware 1024 that support multiple virtual machines 1040.

Virtual machine 1040 or a physical machine may run a remote desktop accessible by computing device 210. For example, virtual machine 1040 or a physical machine may implement guest operating system 1042 that supports VDI host agent 1050 to provide access to the remote desktop by computing device 210 via VDI client 1010. Physical servers 1020 may be controlled by virtual machine management server 1060 and access a shared persistent storage system 1070.

In this case, computing device 210 has guest OS 1012 running thereon (such as Android). There are multiple user applications running on a desktop of guest OS 1012, one of which is VDI client 1010 (other user applications are not shown in FIG. 10 for simplicity). VDI client 1010 is an example of user interface 230 (see FIG. 2). VDI client 1010 shows a remote desktop wherein multiple windows (e.g., applications) run. These windows are examples of user interface elements 240 and 242 (see FIG. 2). Traditionally, when a user pinches on application windows (e.g., 240 and 242) running on a remote desktop (e.g., 230), the remote desktop window, instead of the individual applications running therein, is zoomed. The embodiments described here allow users to zoom applications separately, which run on a remote desktop shown on a mobile device.

Computer System

Figure 11:
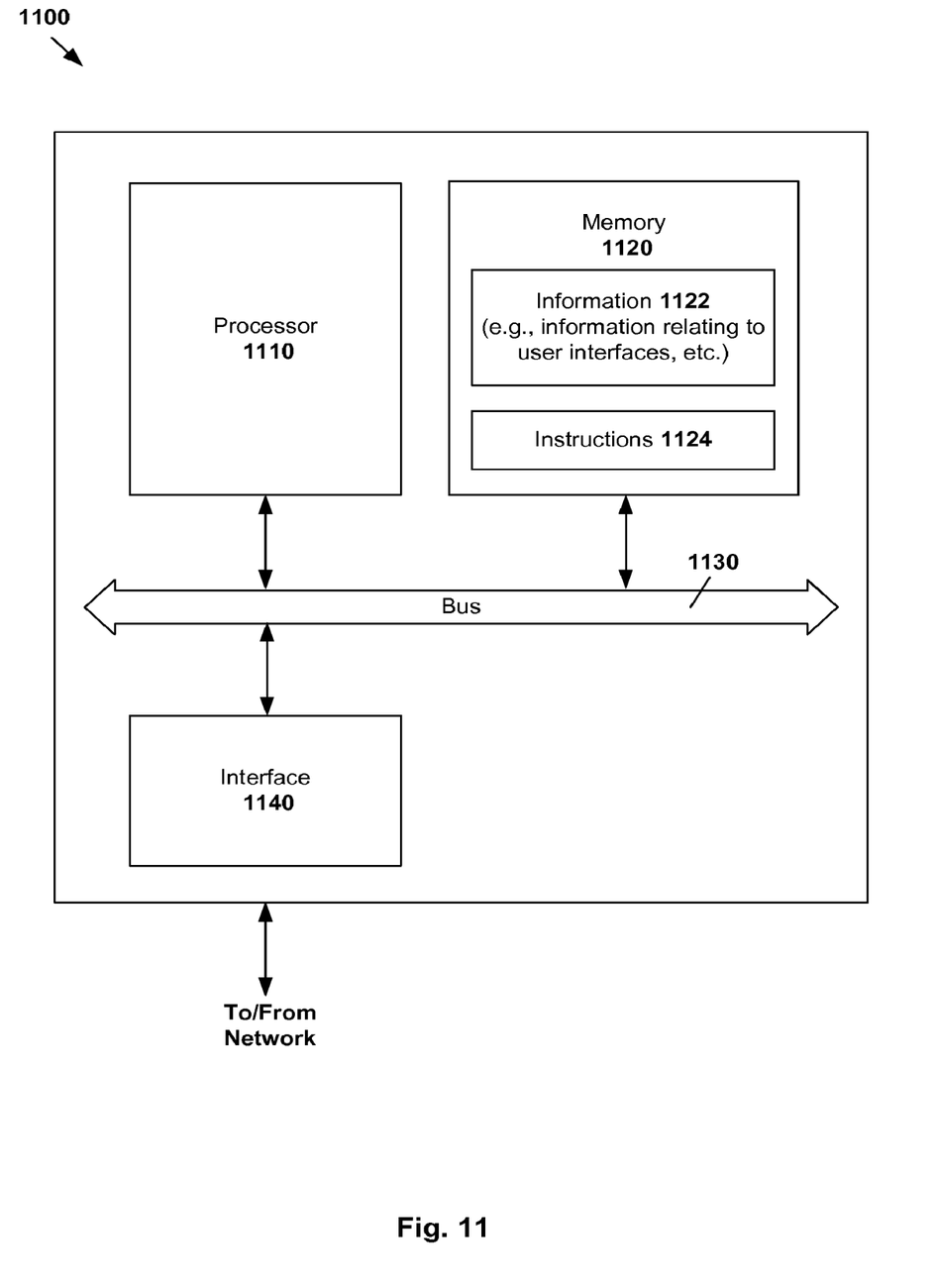
FIG. 11 is a schematic diagram illustrating a computer system for resizing based on pinch gestures.

The above examples can be implemented by hardware, software or firmware or a combination thereof. FIG. 11 is a schematic diagram of an example computer system 1100 for user interface control based on pinch gestures 250. Example computer system 1100 is capable of acting as computing device 210 described herein.

Example computer system 1100 may include processor 1110, memory 1120, network interface device 1140, and bus 1130 that facilitates communication among these illustrated components and other components. Processor 1110 is to perform processes described herein with reference to FIG. 1 to FIG. 10. Memory 1120 may store relevant information 1122 to perform user interface control based on pinch gestures 250, such as information relating to user interfaces 230 and user interface elements 240, etc. Memory 1120 may further store machine-readable instructions 1124 executable by processor 1110 to cause processor 1110 to perform processes described herein with reference to FIG. 1 to FIG. 10.

The methods, processes and components described herein may be implemented by hardware (including hardware logic circuitry), software or firmware or a combination thereof. The term 'processor' is to be interpreted broadly to include a processing unit, ASIC, logic unit, or programmable gate array etc. The techniques introduced above may be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.)

The figures are only illustrations of an example, wherein the units, components or processes shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method for performing a resizing operation on a user interface element based on a pinch gesture made on a touch-sensitive display of a computing device, the method comprising:

displaying, on the touch-sensitive display, a user interface that includes the user interface element, wherein a tap gesture made on the user interface element causes the user interface element to be in a foreground state;

detecting a pinch gesture on the touch-sensitive display that is displaying the user interface that includes the user interface element;

determining a direction of the pinch gesture based on a plurality of touch points on the touch-sensitive display, wherein the direction of the pinch gesture is determined to be horizontal when an angle between the plurality of touch points is less than a first angle threshold, wherein the direction of the pinch gesture is determined to be vertical when the angle is greater than a second angle threshold, and wherein the direction of the pinch gesture is determined to be diagonal by determining that the angle is greater than the first angle threshold but less than the second angle threshold;

executing a foreground function of an operating system in response to the detection of the pinch gesture to determine whether or not the user interface element is in the foreground state;

determining a selection of the user interface element based on the user interface element being determined to be in the foreground state;

in response to determining the direction of the pinch gesture, selecting an edge or a corner of the user interface element based on a position of a first center point of the user interface element in comparison to a second center point of the user interface and based on the direction of the pinch gesture; and resizing the user interface element by adjusting a position of the selected edge or the selected corner on the user interface based on the direction of the pinch gesture while maintaining an opposite edge or opposite corner of the user interface element stationary on the user interface with respect to the selected direction of the pinch gesture.

2. The method of claim 1, wherein a resizing scale for adjusting the selected edge or the selected corner is based on a speed of the pinch gesture.

3. The method of claim 1, further comprising:

prior to detecting the pinch gesture, detecting the tap gesture on the user interface element that causes the user interface element to be in the foreground state.

4. The method of claim 1, further comprising:

detecting a tap gesture on a second user interface element in the user interface that causes the second user interface element to be in the foreground state and the user interface element that has been resized to be in the background state;

detecting a second pinch gesture on the touch-sensitive display while the second user interface element is in the foreground state; and resizing the second user interface element based on the second pinch gesture.

5. The method of claim 1, wherein the user interface is a virtual desktop interface and wherein the user interface element is an application window displayed in the virtual desktop interface, and wherein resizing the user interface element resizes the application window in the virtual desktop interface without resizing the virtual desktop interface.

6. A non-transitory computer-readable storage medium that includes program instructions that, when executed by a processor of a computing device, cause the processor to perform a method for performing a resizing operation on a user interface element based on a pinch gesture made on a touch-sensitive display of the computing device, the method comprising:

displaying, on the touch-sensitive display, a user interface that includes the user interface element, wherein a tap gesture made on the user interface element causes the user interface element to be in a foreground state;

detecting a pinch gesture on the touch-sensitive display that is displaying the user interface that includes the user interface element;

determining a direction of the pinch gesture based on a plurality of touch points on the touch-sensitive display, wherein the direction of the pinch gesture is determined to be horizontal when an angle between the plurality of touch points is less than a first angle threshold, wherein the direction of the pinch gesture is determined to be vertical when the angle is greater than a second angle threshold, and wherein the direction of the pinch gesture is determined to be diagonal by determining that the angle is greater than the first angle threshold but less than the second angle threshold;

executing a foreground function of an operating system in response to the detection of the pinch gesture to determine whether or not the user interface element is in the foreground state;

determining a selection of the user interface element based on the user interface element being determined to be in the foreground state;

in response to determining the direction of the pinch gesture, selecting an edge or a corner of the user interface element based on a position of a first center point of the user interface element in comparison to a second center point of the user interface and based on the direction of the pinch gesture; and resizing the user interface element by adjusting a position of the selected edge or the selected corner on the user interface based on the direction of the pinch gesture while maintaining an opposite edge or opposite corner of the user interface element stationary on the user interface with respect to the selected direction of the pinch gesture.

7. The non-transitory computer-readable storage medium of claim 6, wherein a resizing scale for adjusting the selected edge or the selected corner is based on a speed of the pinch gesture.

8. The non-transitory computer-readable storage medium of claim 6, wherein the method further comprises:

detecting a tap gesture on a second user interface element in the user interface that causes the second user interface element to be in the foreground state and the user interface element that has been resized to be in the background state;

detecting a second pinch gesture on the touch-sensitive display while the second user interface element is in the foreground state; and resizing the second user interface element based on the second pinch gesture.

9. The non-transitory computer-readable storage medium of claim 6, wherein the user interface is a virtual desktop interface and wherein the user interface element is an application window displayed in the virtual desktop interface, and wherein resizing the user interface element resizes the application window in the virtual desktop interface without resizing the virtual desktop interface.

10. A system, comprising:

a computing device having a processor and a touch-sensitive display; and instructions executable in the processor of the computing device, wherein, when executed, the instructions cause the computing device to perform a method of resizing a user interface element based on a pinch gesture made on the touch-sensitive display, said method comprising:

displaying, on the touch-sensitive display of the computing device, a user interface that includes the user interface element, wherein a tap gesture made on the user interface element causes the user interface element to be in a foreground state;

detecting a pinch gesture on the touch-sensitive display that is displaying the user interface that includes the user interface element;

determining a direction of the pinch gesture based on a plurality of touch points on the touch-sensitive display, wherein the direction of the pinch gesture is determined to be horizontal when an angle between the plurality of touch points is less than a first angle threshold, wherein the direction of the pinch gesture is determined to be vertical when the angle is greater than a second angle threshold, and wherein the direction of the pinch gesture is determined to be diagonal by determining that the angle is greater than the first angle threshold but less than the second angle threshold;

executing a foreground function of an operating system in response to the detection of the pinch gesture to determine whether or not the user interface element is in the foreground state;

determining a selection of the user interface element based on the user interface element being determined to be in the foreground state;

in response to determining the direction of the pinch gesture, selecting an edge or a corner of the user interface element based on a position of a first center point of the user interface element in comparison to a second center point of the user interface and based on the direction of the pinch gesture; and resizing the user interface element by adjusting a position of the selected edge or the selected corner on the user interface based on the direction of the pinch gesture while maintaining an opposite edge or opposite corner of the user interface element stationary on the user interface with respect to the selected direction of the pinch gesture.

11. The system of claim 10, wherein the method further comprises:

detecting a tap gesture on a second user interface element in the user interface that causes the second user interface element to be in the foreground state and the user interface element that has been resized to be in the background state;

detecting a second pinch gesture on the touch-sensitive display while the second user interface element is in the foreground state; and resizing the second user interface element based on the second pinch gesture.

12. The system of claim 10, wherein the user interface is a virtual desktop interface and wherein the user interface element is an application window displayed in the virtual desktop interface, and wherein resizing the user interface element resizes the application window in the virtual desktop interface without resizing the virtual desktop interface.

* * * * *